United States Patent
Kaminski

(10) Patent No.: US 12,278,927 B2
(45) Date of Patent: Apr. 15, 2025

(54) DEVICE, SYSTEM, AND METHOD FOR TRANSFERRING CALLS TO PUBLIC-SAFETY ANSWERING POINTS

(71) Applicant: MOTOROLA SOLUTIONS, INC., Chicago, IL (US)

(72) Inventor: Rafal Kaminski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 442 days.

(21) Appl. No.: 17/948,812

(22) Filed: Sep. 20, 2022

(65) Prior Publication Data
US 2024/0098181 A1 Mar. 21, 2024

(51) Int. Cl.
  *H04W 4/00* (2018.01)
  *H04M 3/51* (2006.01)
  *H04M 3/58* (2006.01)

(52) U.S. Cl.
  CPC ........... *H04M 3/5116* (2013.01); *H04M 3/58* (2013.01)

(58) Field of Classification Search
  CPC ..... H04W 64/00; H04W 24/10; H04W 4/024; H04W 68/005; H04W 8/08; H04M 3/58
  See application file for complete search history.

(56) References Cited

U.S. PATENT DOCUMENTS

| | | | |
|---|---|---|---|
| 7,440,442 B2 * | 10/2008 | Grabelsky | H04Q 3/0025 370/352 |
| 7,443,972 B1 | 10/2008 | Barlow et al. | |
| 9,516,162 B2 | 12/2016 | Golan et al. | |
| 2015/0023478 A1 * | 1/2015 | Meer | H04M 3/5116 379/45 |
| 2016/0301801 A1 | 10/2016 | Hanya et al. | |
| 2016/0316493 A1 | 10/2016 | Davis et al. | |

OTHER PUBLICATIONS

PCT/US2023/031037, Device, System, and Method for Transferring Calls to Public-Safety Answering Points, Aug. 24, 2023.
NENA i3 Standard for Next Generation 9-1-1, pp. 206-237 (Chapter 4.7) of https://cdn.ymaws.com/www.nena.org/resource/resmgr/standards/nena-sta-010.3b-2021_i3_stan.pdf, Published: Oct. 7, 2021.

* cited by examiner

*Primary Examiner* — Phuoc H Doan
(74) *Attorney, Agent, or Firm* — PERRY + CURRIER, INC.

(57) ABSTRACT

A device, system and method for transferring calls to public-safety answering points is provided. A call routing devices receives, from a plurality of public-safety answering points (PSAPs), status data indicating respective states of the plurality of PSAPs. The call routing device receives a call to be routed to a first PSAP of the plurality of PSAPs. The call routing device generates a list of other PSAPs, of the plurality of PSAPs, prioritized according to the status data. The call routing device routes the call to the first PSAP, the call routed with the list. The call routing device receives, from the first PSAP, an indication to transfer the call to a second PSAP selected from the list. The call routing device transfers the call to the second PSAP.

20 Claims, 7 Drawing Sheets

DEVICE, SYSTEM, AND METHOD FOR TRANSFERRING CALLS TO PUBLIC-SAFETY ANSWERING POINTS

BACKGROUND OF THE INVENTION

In emergency services environments that include public-safety answering points (PSAPs), call routing devices may often route a call to a PSAP, which may not have capacity to handle the call.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
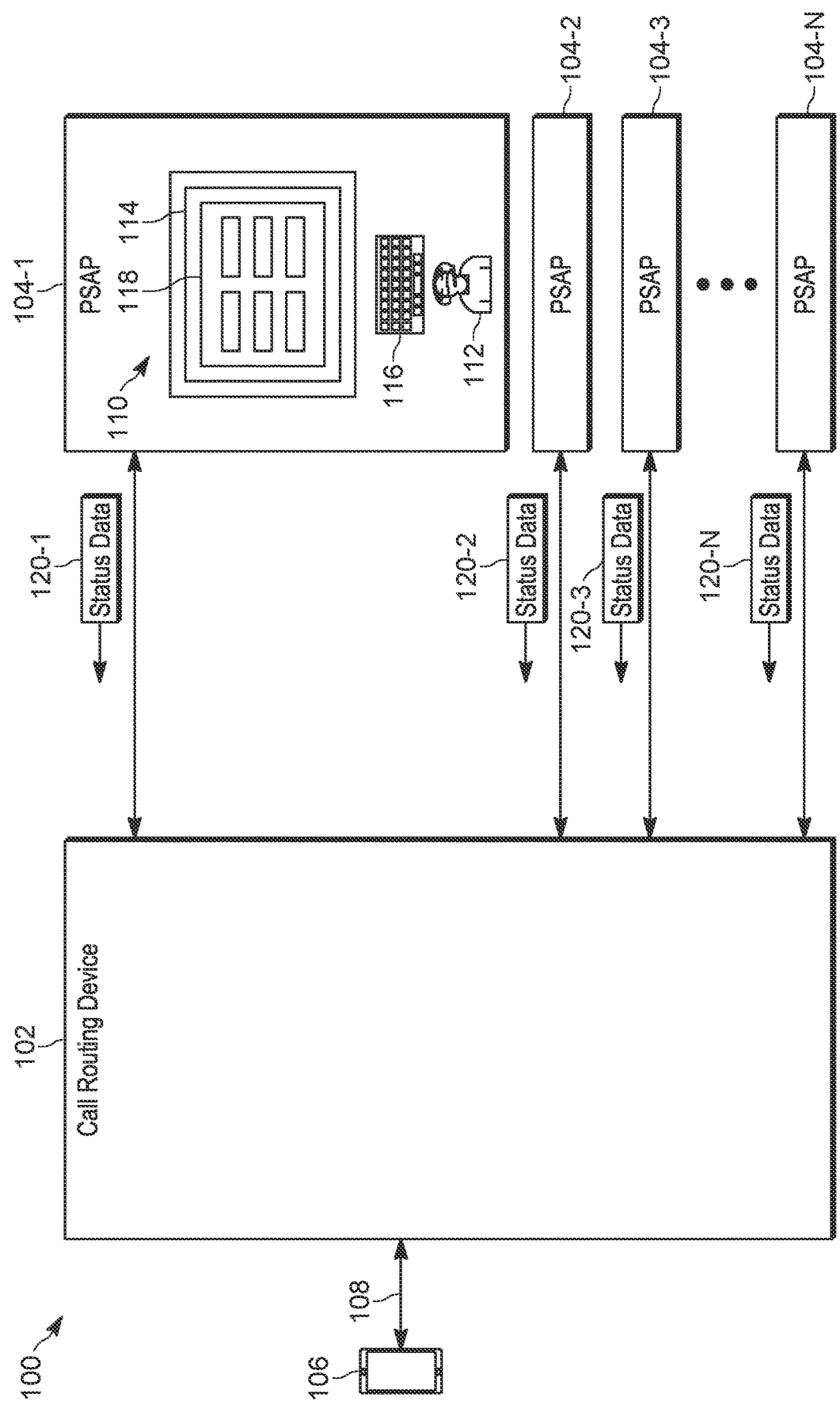
FIG. 1 is a system for transferring calls to public-safety answering points, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In emergency services environments that include public-safety answering points (PSAPs), call routing devices may often route a call to a PSAP, which may not have capacity to handle the call. For example, a call routing device may determine a location associated with a call and route the call to a PSAP that services an area that includes the location. However a capacity of the PSAP may be approaching, or at, a maximum capacity, which may lead to delays in the call being handled at the PSAP. Thus, there exists a need for an improved technical method, device, and system for transferring calls to public-safety answering points.

Hence, provided herein is a device, system and method for transferring calls to public-safety answering points. For example, a system is provided that includes a call routing device (e.g., which may include, but is not limited to a combination of one or more servers, cloud computing devices, routers, proxy devices, and the like) and a plurality of PSAPs. The call routing device receives calls, such as 911 calls, and routes such calls to PSAPs, for example based on respective locations associated with the calls.

However, the PSAPs provided herein are generally adapted to provide, to the call routing device, status data indicating respective states of the PSAPs. Such status data may generally indicate capacity, amongst other possibilities described in more detail below, and the like, of a respective PSAP to handle calls (e.g., a number of calls presently in a queue, and a maximum queue length, and the like). The call routing device may receive a call and route the call to a first PSAP with a list of other PSAPs, of the plurality of PSAPs, prioritized according to the status data. For example, a PSAP with highest capacity for handling calls may be first on the list, a PSAP with next highest capacity for handling calls may be second on the list, etc. The list may, however, exclude the first PSAP.

The first PSAP may receive the call with the list and, when the first PSAP does not have capacity to handle the call, the first PSAP may select a second PSAP from the list. For example, such a selected PSAP on the list may comprise a PSAP that has a highest priority/highest capacity (e.g., and excludes the first PSAP). The first PSAP provides an indication, to the call routing device, to transfer the call to the second PSAP.

The call routing device receives the indication and may transfer the call to the second PSAP. The list may also be provided to the second PSAP with the call transfer. When the second PSAP has capacity, the second PSAP may handle the call; however, when the second PSAP does not have capacity to handle the call (e.g., which may have changed since the list was generated), the second PSAP may provide, to the call routing device, a respective indication to transfer the call to a third PSAP selected from the list (e.g., a PSAP with next highest capacity). The call routing device may then transfer the call to the third PSAP, again with the list.

Indeed, the call routing device may attempt to transfer the call to any suitable number of PSAPs based on the list, and receive indications to transfer the call to another PSAP from the list, as selected by PSAPs to which the call was transferred, the indications received from the PSAPs to which the call was transferred.

A first aspect of the present specification provides a call routing device comprising: a communication interface; a controller configured to: receive, via the communication interface, from a plurality of public-safety answering points (PSAPs), status data indicating respective states of the plurality of PSAPs; receive, via the communication interface, a call to be routed to a first PSAP of the plurality of PSAPs; generate a list of other PSAPs, of the plurality of PSAPs, prioritized according to the status data; route, via the communication interface, the call to the first PSAP, the call routed with the list; receive, via the communication interface, from the first PSAP, an indication to transfer the call to a second PSAP selected from the list; and transfer, via the communication interface, the call to the second PSAP.

A second aspect of the present specification provides a system comprising: a call routing device; and a plurality of public-safety answering points (PSAPs), including a first PSAP, the call routing device configured to: receive, from the plurality of PSAPs, status data indicating respective states of the plurality of PSAPs; receive a call to be routed to the first PSAP of the plurality of PSAPs; generate a list of other PSAPs, of the plurality of PSAPs, prioritized according to the status data; route the call to the first PSAP, the call routed with the list; receive from the first PSAP, an indication to transfer the call to a second PSAP selected from the list; and transfer the call to the second PSAP, the first PSAP device configured to: receive, from the call routing device, call routing information associated with the call and the list of the other PSAPs prioritized according to the status data; generate the indication to transfer the call to the second PSAP, the second PSAP selected from the list based on a respective priority, or via an input device; and provide, to the call routing device, the indication to transfer the call to the second PSAP to cause the call routing device to transfer the call to the second PSAP.

A third aspect of the present specification provides a public-safety answering point (PSAP) comprising: a communication interface; a controller configured to: receive, via the communication interface, from a call routing device, call routing information associated with a call received at the call routing device, and a list of other PSAPs prioritized according to status data associated with the other PSAPs; generate an indication to transfer the call to a second PSAP, the second PSAP selected from the list based on a respective priority, or via an input device; and provide, via the communication interface, to the call routing device, the indication to transfer the call to the second PSAP to cause the call routing device to transfer the call to the second PSAP.

A fourth aspect of the present specification provides a method comprising: receiving, via a call routing device, from a plurality of public-safety answering points (PSAPs), status data indicating respective states of the plurality of PSAPs; receiving, via the call routing device, a call to be routed to a first PSAP of the plurality of PSAPs; generating, via the call routing device, a list of other PSAPs, of the plurality of PSAPs, prioritized according to the status data; routing, via the call routing device, the call to the first PSAP, the call routed with the list; receiving, via the call routing device, from the first PSAP, an indication to transfer the call to a second PSAP selected from the list; and transferring, via the call routing device, the call to the second PSAP.

A fifth aspect of the present specification provides a method comprising: receiving, at a first PSAP, from a call routing device, call routing information associated with a call received at the call routing device, and a list of other PSAPs prioritized according to status data associated with the other PSAPs; generating, at the first PSAP, an indication to transfer the call to a second PSAP, the second PSAP selected from the list based on a respective priority, or via an input device; and providing, from the first PSAP, to the call routing device, the indication to transfer the call to the second PSAP to cause the call routing device to transfer the call to the second PSAP.

Each of the above-mentioned aspects will be discussed in more detail below, starting with example system and device architectures of the system, in which the embodiments may be practiced, followed by an illustration of processing blocks for achieving an improved technical method, device, and system for transferring calls to public-safety answering points.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for transferring calls to public-safety answering points. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a call routing device 102, which may generally be configured as a call-handing device and/or call-taking device, amongst other possibilities, for a plurality of PSAPs 104-1, 104-2, 104-3 . . . 104-N. The plurality of PSAPs 104-1, 104-2, 104-3 . . . 104-N are interchangeably referred to hereafter, collectively, as the PSAPs 104 and, generically, as a PSAP 104. This convention will be used throughout the present specification. Furthermore the PSAP 104-1 is interchangeably referred to as the first PSAP 104-1, the PSAP 104-2 is interchangeably referred to as the second PSAP 104-2, the PSAP 104-3 is interchangeably referred to as the third PSAP 104-3, etc.

As depicted, the call routing device 102 may be configured to communicate with a communication device 106 to receive a call 108 (e.g., as represented by a communication link between the communication device 106 and the call routing device 102) as a proxy for one or more of the PSAPs 104.

While an "N" number of PSAPs 104 and one communication device 106 are depicted, the system 100 may comprise any suitable number of PSAPs 104 and communication devices 106, and the call routing device 102 may be configured to receive any suitable number of calls, and provide call-handing and/or call-taking functionality for any suitable number of PSAPs 104. Hence, the number "N" may be any suitable number.

The call routing device 102 may comprise any suitable combination of one or more servers, one or more cloud computing devices, one or more routers, one or more proxy devices, and the like.

The call routing device 102 may receive an associated location with the call 108 (e.g., as metadata) and route the call 108 to an appropriate PSAP 104, for example a PSAP 104 associated with an area and/or location and/or jurisdiction, which includes the associated location, and the like, amongst other possibilities. Indeed, the PSAPs 104 may be associated with different areas and/or different jurisdictions (e.g., cities, towns, counties, amongst other possibilities), though such areas and/or jurisdictions may be proximal one another and/or areas may overlap. Hence, while different PSAPs 104 may be associated with different areas and/or different jurisdictions, the PSAPs 104 may be generally configured to handle calls, such as the call 108, associated with locations that are outside of their respective associated areas and/or respective associated jurisdictions. For example, the PSAPs 104 may be configured to handle calls associated with a respective area and/or respective jurisdiction, for example to dispatch first responders to incidents in the respective area and/or respective jurisdiction; however the PSAP 104 may be further configured to handle calls associated with respective areas and/or respective jurisdictions of the other PSAPs 104, for example to dispatch first responders to incidents in the respective areas and/or respective jurisdictions of the other PSAPs 104.

In a particular example, the call routing device 102 may include a combination of an access or service provider router, and/or any other suitable call routing devices. As the first PSAP 104-1 may be associated with an area and/or location and/or jurisdiction, which includes the associated location, and the call routing device 102 may route the call 108 to the first PSAP 104, which may in turn transfer the call to a PSAP terminal 110, or another PSAP terminal, of the first PSAP 104. Indeed, while one PSAP terminal 110 is depicted, the PSAP 104 may include any suitable number of PSAP terminals.

As depicted, the PSAP terminal 110 may be operated by an operator 112, and comprises a display screen 114 and an input device 116 (e.g., as such a keyboard, as depicted, a pointing device and/or any other suitable input device). However, the display screen 114 and the input device 116 may be provided in any suitable format (e.g., different from a PSAP terminal), such as a laptop, a personal computer, and the like (e.g., when the operator 112 is working from home and/or "off-premises" from the PSAP 104). In general, the display screen 114 and the input device 116 may be used to interact with the PSAP terminal 110, for example via an interface 118 provided at the display screen 114, and the like.

It is understood that a PSAP 104 further generally comprises call handling and/or processing components for handling calls routed thereto. It is furthermore understood that a PSAP 104 may have a certain capacity for handling calls and/or "busyness" (e.g., how busy a PSAP 104 may be) of a PSAP 104 may be such that handling calls is affected. For example, a PSAP 104 may be able to handle a maximum number of calls, and which may depend on a number of PSAP terminals 110 available to handle calls (e.g., and which may change over time as operators 112 go on and off duty), and/or available processing resources at the PSAP 104 that are available to handle calls.

Furthermore, calls routed to a PSAP 104 may be placed in a queue. Hence, capacity and/or busyness of a PSAP 104 may be represented by a number of calls in a respective queue relative to a respective maximum number of calls. Alternatively, capacity and/or busyness of a PSAP 104 may be represented by a number of calls that a PSAP 104 is presently able to handle. However, it is understood that capacity and/or busyness of a PSAP 104 may be represented in any suitable manner. However, a PSAP 104 may be in any suitable state that represents capacity and/or busyness, including but not limited to, an offline state (e.g., in which a PSAP 104 is at least temporarily unable to handle calls), and the like, amongst other possibilities.

As depicted, the PSAPs 104 may be adapted to provide respective status data 120-1, 120-2, 120-3 . . . 120-N (e.g., status data 120 and/or a set of status data 120) to the call routing device 102. The status data 120 is generally indicative of respective states of the PSAPs 104 including, but not limited to, a capacity and/or busyness of a respective PSAP 104. The status data 120 may be received at the call routing device 102 prior to the call routing device 102 receiving the call 108.

The status data 120 may be provided periodically by the PSAPs 104, and/or respective status data 120 may be provided by a PSAP 104 when a change to a state of the PSAP 104 changes (e.g., capacity changes), and/or the status data 120 may be provided by the PSAPs 104 upon request by the call routing device 102 (e.g., periodically and/or according to any other suitable scheme), amongst other possibilities.

As will be described in more detail below, the call routing device 102 may receive the status data 120 and generate a list of the PSAPS 104 prioritized according to the status data 120. For example, PSAPs 104 with higher capacity (or lower busyness), as indicated by the status data 120, may be assigned a higher priority at such a list, while PSAPs 104 with lower capacity (or higher busyness), as indicated by the status data 120, may be assigned a lower priority at such a list. In a particular example, when the first PSAP 104-1 has a highest capacity (or lowest busyness), relative to the other PSAPs 104, the first PSAP 104-1 may be assigned a highest priority on such a list. Similarly, when the second PSAP 104-2 has a next highest capacity (or next lowest busyness), relative to the other PSAPs 104, the second PSAP 104-2 may be assigned a next highest priority on such a list.

In a particular example, the call routing device 102 may route the call 108 to the first PSAP 104-1 based on an associated location of the call 108 (e.g., and not based on the aforementioned list and/or independent of capacity of the first PSAP 104-1), for example as the first PSAP 104 may be associated with an area and/or jurisdiction that includes the associated location of the call 108. Put another way, the first PSAP 104-1 may generally be configured to dispatch first responders that service the area and/or jurisdiction that includes the associated location of the call 108.

However, the call routing device 102 may generally route the call 108 to the first PSAP 104-1 with the aforementioned list, however with the first PSAP 104-1 excluded from the list (e.g., to reduce processing time of the list at the first PSAP 104-1; for example, when the first PSAP 104-1 is not excluded from the list, the first PSAP 104-1 may need to be configured to ignore itself on the list).

Presuming that the first PSAP 104-1 no longer has capacity to handle the call 108, the first PSAP 104-1 may select another PSAP 104 from the list, such as a PSAP 104 that has a highest priority, and provide, to the call routing device 102, an indication to transfer the call 108 to the selected PSAP 104. Put another way, the PSAP 104-1 may not accept the call 108 and select another PSAP 104 from the list to which the call 108 may be transferred. Hereafter, it is understood that a PSAP 104 not accepting a call may include, but is not limited to, not handling a call, and the like due, for example, to a call ringing and Ring No Answer (RNA) timer elapsing amongst other possibilities.

Selection of a PSAP 104 to which to transfer the call 108 may occur automatically, for example based on priorities of the PSAP 104 on the list. In particular, a PSAP 104 with the highest priority on the list (e.g., which is not the first PSAP 104-1 to which the call 108 was routed) may be automatically selected.

Alternatively, selection of a PSAP 104 to which to transfer the call 108 may occur via the input device 116; for example, the display screen 114 may be controlled to render the list of the PSAPs 104, with the priorities, and the operator 112 may interact with the input device 116 to select a PSAP 104 to which to route the call 108.

The call routing device 102 receives the indication to transfer the call 108 to the selected PSAP 104, for example the second PSAP 104-2, and transfers to the call 108 to the selected PSAP 104, with the list. Hereafter the second PSAP 104-2 will be used an example of the selected PSAP 104.

The second PSAP 104-2 may receive the call 108 and the list. In some examples the first PSAP 104-1 and the second PSAP 104-2 may be excluded from the list. However, the list may be updated, prior to providing to the second PSAP 104-2, based on any status data 120 received during the call transfer and/or call routing processes and hence the list may include at least the first PSAP 104-1, for example when the status of the first PSAP 104-1 changes during or after the first PSAP 104-1 does not accept the call 108.

When the second PSAP 104-2 has capacity, the second PSAP 104-2 may handle the call 108. However, when the second PSAP 104-2 does not have capacity, the second PSAP 104-2 may select another PSAP 104 from the list, similar to the first PSAP 104-1 selecting another PSAP 104 has described above (e.g., based on priority).

The second PSAP 104-2 may provide, to the call routing device 102, an indication to transfer the call 108 to the selected PSAP 104, such as the third PSAP 104-3, and the call routing device 102 may transfer the call 108 to the third PSAP 104-3, again with the list (e.g., which may include or exclude one or more of the first PSAP 104-1, the second PSAP 104-2 and the third PSAP 104-3).

The third PSAP 104-3 may receive the call 108 and the list (e.g., which may be updated), and when the third PSAP 104-3 has capacity, the third PSAP 104-3 may handle the call 108. However, when the third PSAP 104-3 does not have capacity, the third PSAP 104-3 may select another PSAP 104 from the list, similar to the first PSAP 104-1 and/or the second PSAP 104-2 selecting another PSAP 104 as described above (e.g., based on priority of PSAPs 104 on the list). The third PSAP 104-3 may provide, to the call routing device 102, an indication to transfer the call 108 to the selected PSAP 104, such as the PSAP 104-N, and the call routing device 102 may transfer the call 108 to the PSAP 104-N etc.

Such an example illustrates that call 108 may be transferred to successive PSAPs 104 until the call 108 reaches a PSAP 104 that has capacity to handle the call 108.

In some examples, the call 108 may only be transferred a maximum number of times before a PSAP 104 that receives the call 108 is prevented from transferring the call 108, for example to reduce a call handling time of the call 108.

Furthermore it is understood that respective status data 120 may continue to be provided and/or updated as the respective status data 120 for a PSAP 104 changes (e.g., capacity and/or busyness increases or decreases, and/or a PSAP 104 goes on or offline, and the like). As such, the aforementioned list that is provided to a PSAP 104 with the call 108 may be dynamic, and may change between transfers of the call 108 from one PSAP 104 to another PSAP 104.

For example, in an example where the first PSAP 104-1 initially provides an indication to transfer the call 108 to the second PSAP 104-2, respective status data 120 of the first PSAP 104-1 may change, such that the list provided to the second PSAP 104-2 may include the first PSAP 104-1, but with a priority that has changed relative to when the call 108 was initially transferred to the first PSAP 104-1. In these examples, the second PSAP 104-2 may provide, to the call routing device, 102, an indication to transfer the call 108 to the first PSAP 104-1 (e.g., back to the first PSAP 104-1) as in the time between the first PSAP 104-1 not accepting the call 108 and the call 108 being transferred to the second PSAP 104-2, capacity of the first PSAP 104-1 may have increased.

Hence, while in some examples, the aforementioned list may exclude PSAPs 104 to which the call 108 has previously been transferred, in other examples the aforementioned list may include any of the PSAP 104, though the list may exclude a PSAP 104 to which the call 108 is presently being transferred.

It is furthermore understood that communication between the call routing device 102 and the PSAPs 104 may occur according to a Sessions Initiation Protocol (SIP). For example, the call 108 may be transferred to a PSAP 104 by the call routing device 102 using a SIP INVITE message; in these examples, the aforementioned list may be provided to a PSAP 104 in a header of the SIP INVITE message. Similarly, an indication to transfer the call 108 to another PSAP 104 may occur via a SIP REFER message. As such, it is understood that routing and/or transferring of a call to a PSAP 104, as described herein may include exchanging SIP messages that invite a PSAP 104 to receive the call 108, but without the call 108 actually being connected to the invited PSAP 104; in these examples, the call 108 may be placed on hold at the call routing device 102 while the routing and/or transferring is occurring, for example until the call 108 is connected to a PSAP 104.

Figure 2:
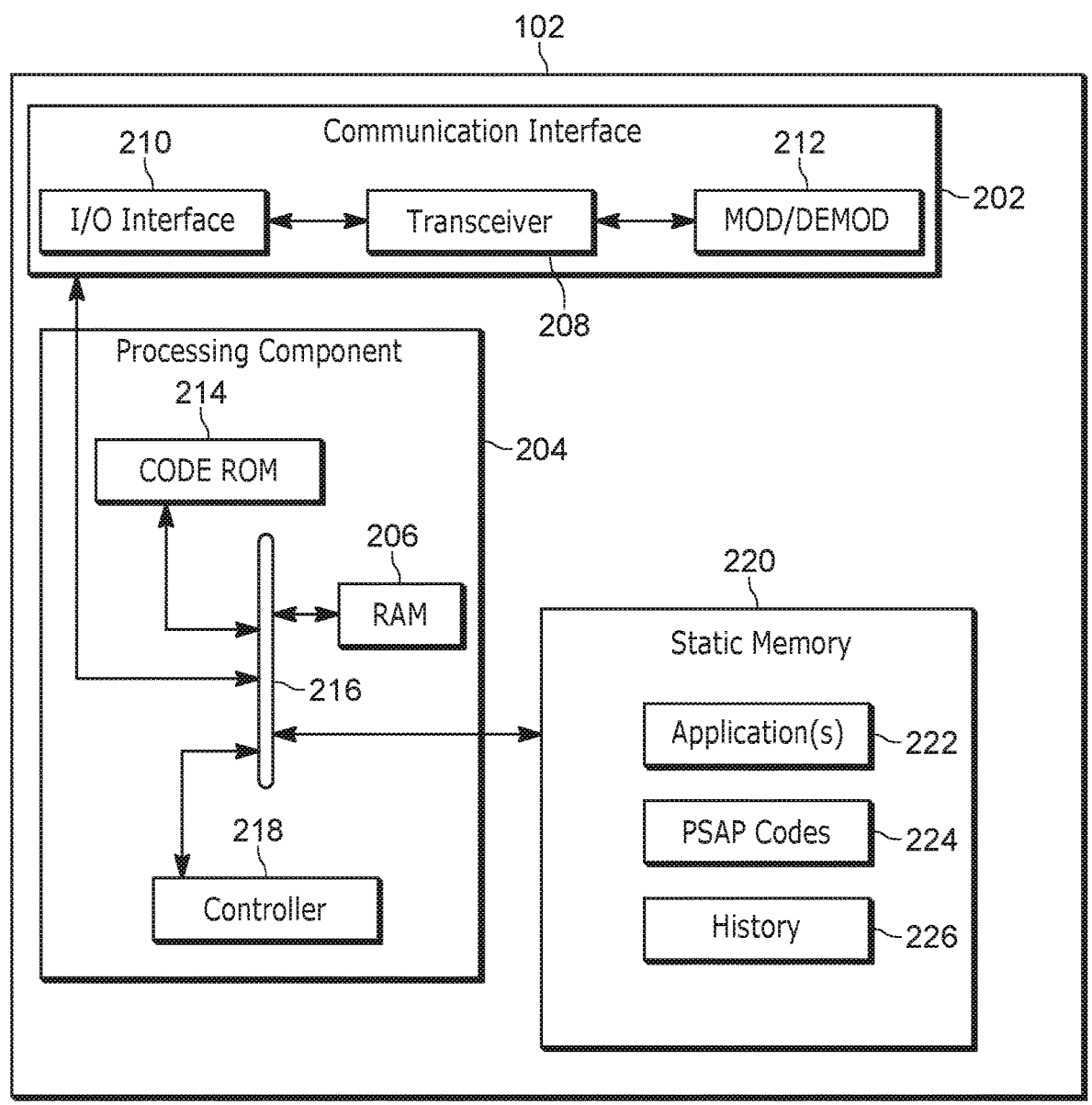
FIG. 2 is a device diagram showing a device structure of a communication device for transferring calls to public-safety answering points, in accordance with some examples.

Attention is next directed to FIG. 2, which depicts a schematic block diagram of an example of the call routing device 102. While the call routing device 102 is depicted in FIG. 2 as a single component, functionality of the call routing device 102 may be distributed among a plurality of components and the like including, but not limited to, any suitable combination of one or more servers, one or more cloud computing devices, one or more routers, one or more proxy devices, and the like. In some examples, a portion of the functionality of the call routing device 102 may be integrated with one or more of the PSAPs 104.

As depicted, the call routing device 102 comprises: a communication interface 202, a processing unit 204, a Random-Access Memory (RAM) 206, one or more wireless transceivers 208 (e.g., which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the call routing device 102 may have any suitable structure and/or configuration.

While not depicted, the call routing device 102 may include, and/or be in communication with, one or more of an input device and a display screen (and/or any other suitable notification device) and the like, such as the input device 116 and/or the display screen 114 of the PSAP terminal 110, and the like.

As shown in FIG. 2, the call routing device 102 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the call routing device 102 is not a generic controller and/or a generic device, but a device specifically configured to implement functionality for transferring calls to public-safety answering points. For example, in some examples, the call routing device 102 and/or the controller 218 specifically comprises a computer executable engine configured to implement functionality for transferring calls to public-safety answering points.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the call routing device 102 as described herein are maintained, persistently, at the memory 220 and used by the controller 218, which makes appropriate utilization of volatile storage during the execution of such programming instructions.

Figure 3:
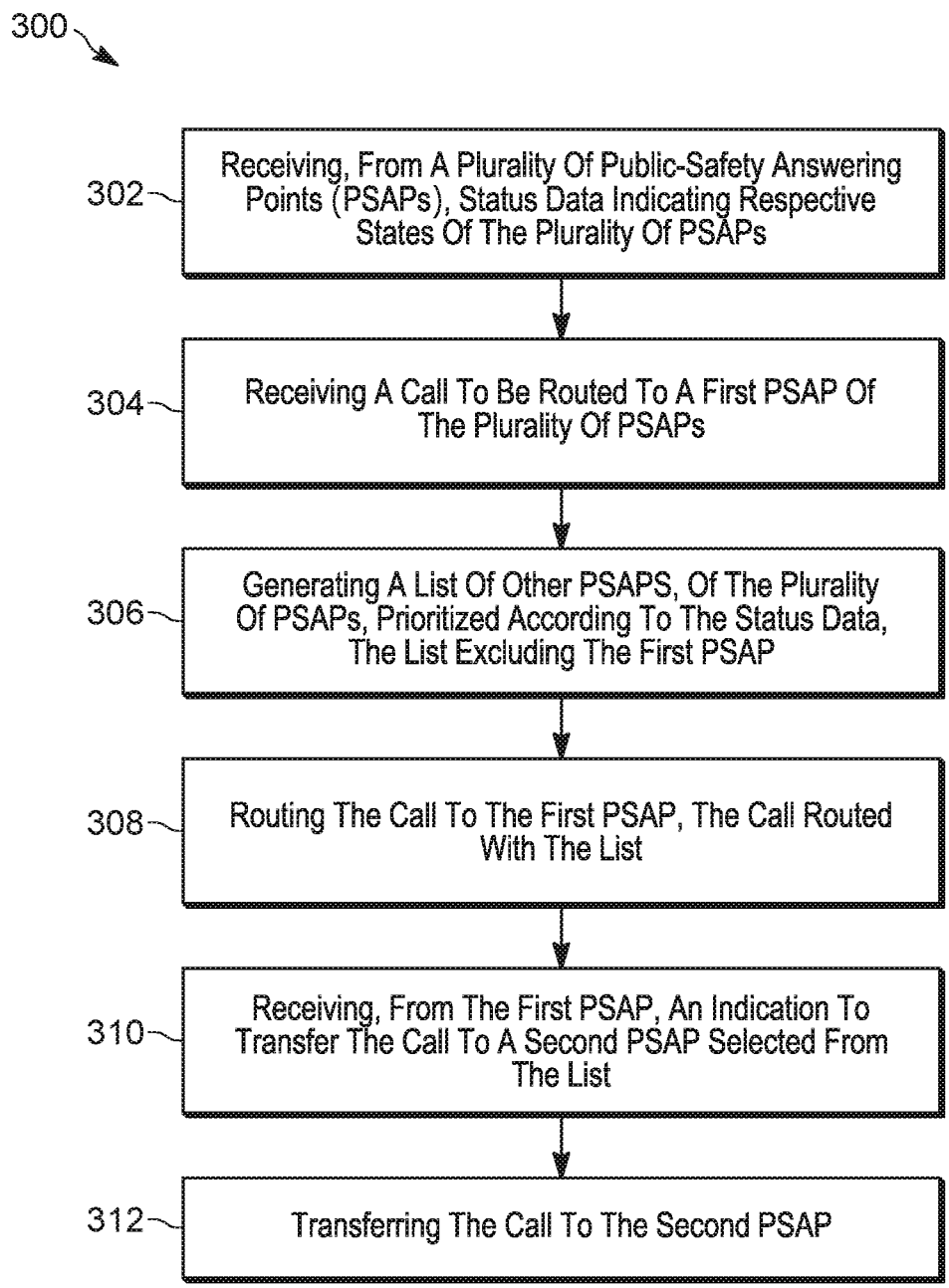
FIG. 3 is a flowchart of a method for transferring calls to public-safety answering points, in accordance with some examples.

In particular, the memory 220 stores instructions corresponding to the at least one application 222 that, when executed by the controller 218, enables the controller 218 to implement functionality for transferring calls to public-safety answering points, including but not limited to, the blocks of the method set forth in FIG. 3.

The application 222 may include programmatic algorithms, and the like, to implement functionality as described herein. Alternatively, and/or in addition to numerical algorithms, the application 222 may include machine learning models and/or algorithms, and the like, which have been trained to implement functionality for transferring calls to public-safety answering points. Furthermore, the application 222 may be operated in a training mode to train machine learning models and/or algorithms thereof to implement functionality for transferring calls to public-safety answering points.

The one or more machine learning models and/or algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments, such as PSAP environments, and the like. Any suitable machine learning algorithm and/or deep learning algorithm and/or neural network is within the scope of present examples.

As depicted, the memory 220 further stores PSAP codes 224, which may be optional, and which may comprise alphanumeric codes, and the like, mapped to network addresses of the PSAPs 104 and/or any other suitable information that enables the call routing device 102 to transfer a call to a PSAP 104 identified by a PSAP code 224. For example, a PSAP code 224 of the first PSAP 104-1 may comprise text "104-1" and may be mapped to a network address of the first PSAP 104-1, and the like; similarly, a PSAP code 224 of the second PSAP 104-2 may comprise text "104-2" and may be mapped to a network address of the second PSAP 104-2, and the like; similarly, a PSAP code 224 of the third PSAP 104-3 may comprise text "104-3" and may be mapped to a network address of the third PSAP 104-3, and the like; and, similarly, a PSAP code 224 of the $N^{th}$ PSAP 104-N may comprise text "104-N" and may be mapped to a network address of the second $N^{th}$ PSAP 104-N, and the like. However any suitable codes are within the scope of the present specification. The PSAP codes 224 may be used by the components of the system 100 to identify respective PSAPs 104, and a given PSAP code 224 may be used to determine a network address of a respective PSAP 104, and/or used to transfer a call to a PSAP 104 identified by a PSAP code 224 and the like. It is understood that the PSAP codes 224 may be available and/or stored at the PSAPs 104.

As depicted, the memory 220 further stores a history 226 of previous call routings and/or call transfers to the PSAPs 104. For example, the history 226 may indicate that calls associated with an area and/or jurisdiction of a given PSAP 104 were generally routed to, but not accepted by, the given PSAP 104 and transferred to another PSAP 104, for example due to consistently low capacity at the given PSAP 104, amongst other possibilities. In a specific example, the history 226 may indicate that calls not accepted by the first PSAP 104-1 were transferred to the second PSAP 104-2, which consistently also did not accept the calls, but that calls routed to the third PSAP 104-3 were consistently accepted by the third PSAP 104-3. While the term "consistently" is relative, such consistency may be based on thresholds, amongst other possibilities. For example, when a percentage of calls above a threshold percentage of 75%, 85%, 90%, 95%, amongst other possibilities, are not accepted by the second PSAP 104-2, the controller 218 may determine that the second PSAP 104-2 consistently did not accept calls. Similarly, when a percentage of calls above a respective threshold percentage of 75%, 85%, 90%, 95%, amongst other possibilities, are accepted by the third PSAP 104-3, the controller 218 may determine that the third PSAP 104-3 consistently accepts calls. Previous status data 120 may also be stored at the history 226. In general, the history 226 may indicate that calls received at the call routing device 102 associated with a location located in an area and/or jurisdiction for one PSAP 104 may be better handled by another PSAP 104, amongst other possibilities. The history 226 may further indicate times of day, and the like, given PSAPs 104 do not accept or accept calls. Indeed, the history 226 may include any suitable information regarding previous call routings and/or call transfers to the PSAPs 104. Furthermore, the history 226 may be used to adjust and/or reassign priorities of the PSAPs 104, as described in further detail below.

While not depicted, the memory 220 may further store indications of areas and/or jurisdictions associated with respective PSAPs 104.

While the PSAP codes 224 and the history 226 are depicted as being stored at the memory 220, in other examples the PSAP codes 224 and/or the history 226 (and/or indications of areas and/or jurisdictions associated with respective PSAPs 104) may be stored at a memory and/or database external to the call routing device 102, that is accessible to the call routing device 102.

While details of the PSAPs 104, the PSAP terminal 110 and the communication device 106 are not depicted, the PSAPs 104, the PSAP terminal 110 and the communication device 106 may have components similar to the call routing device 102 adapted, however, for the functionality thereof.

Figure 4:
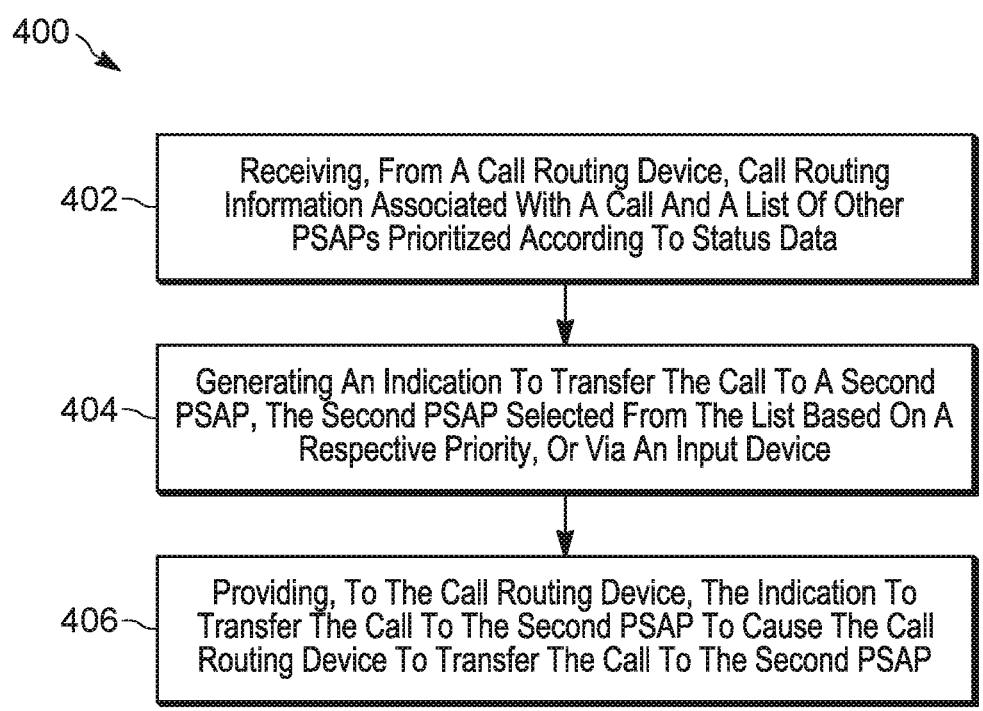
FIG. 4 is a flowchart of a public-safety answering point-side method for transferring calls to public-safety answering points, in accordance with some examples.

For example, a PSAP 104 may comprise a memory (e.g., similar to the memory 220) that stores instructions corresponding to at least one application that, when executed by a controller of the PSAP 104 (e.g., similar to the controller 218), enables the controller to implement functionality for transferring calls to public-safety answering points, including but not limited to, the blocks of the method set forth in FIG. 4.

Attention is now directed to FIG. 3, which depicts a flowchart representative of a call-routing device-side implemented method 300 for transferring calls to public-safety answering points. The operations of the method 300 of FIG. 3 correspond to machine readable instructions that are executed by the call routing device 102, and specifically the controller 218 of the call routing device 102. In the illustrated example, the instructions represented by the blocks of FIG. 3 are stored at the memory 220 for example, as the application 222. The method 300 of FIG. 3 is one way that the controller 218 and/or the call routing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218, and/or the call routing device 102, receives (e.g., via the communication interface 202), from the plurality of PSAPs 104, the status data 120 indicating respective states of the plurality of PSAPs 104.

The status data 120 may the status data comprise one or more of:

Respective current queue lengths of the plurality of PSAPs 104; for example, the status data 120 may comprise respective numbers of calls in a queue at a PSAP 104.

Respective maximum queue lengths of the plurality of PSAPs 104; for example, the status data 120 may comprise respective maximum numbers of calls that a PSAP 104 may maintain in a respective queue, which may depend on processing resources available to the PSAP 104, a number of terminals 110 of the PSAP 104 that are presently being operated by operators 112, amongst other possibilities.

Respective available capacity of the plurality of PSAPs 104. For example, respective available capacity for a PSAP 104 may comprise a ratio of the respective maximum numbers of calls, that a PSAP 104 may maintain in a respective queue, with the respective numbers of calls in a queue at a PSAP 104 subtracted therefrom, as compared to the respective maximum numbers of calls that a PSAP 104 may maintain in a respective queue. For example, when there are 8 calls in a queue at a PSAP 104, and the maximum queue length at a PSAP 104 is 12 calls, the capacity may be expressed as 0.33 (e.g., (12−8)/12) and/or 33%. However, respective available capacity for a PSAP 104 may alternatively comprise the respective maximum numbers of calls with the respective numbers of calls in a queue at a PSAP 104 subtracted therefrom. For example, when there are 8 calls in a queue at a PSAP 104, and the maximum queue length at a PSAP 104 is 12 calls, the capacity may be expressed as 4 calls (e.g., 12−8). However, the capacity may be provided in any suitable manner, such as on a scale of 1 to 10, and the like. In general, the higher the capacity, the more additional calls a PSAP 104 may handle, and vice versa.

Respective busyness of the plurality of PSAPs 104. For example, respective busyness of a PSAP 104 may comprise a ratio the respective numbers of calls in a queue at a PSAP 104, as compared to the respective maximum numbers of calls that a PSAP 104 may maintain in a respective queue. For example, when there are 8 calls in a queue at a PSAP 104, and the maximum queue length at a PSAP 104 is 12 calls, the busyness may be expressed as 0.67 (e.g., (8)/12) and/or 67%. However, the capacity may be provided in any suitable manner, such as on a scale of 1 to 10, and the like. In general, the higher the busyness, the fewer additional calls a PSAP 104 may handle, and vice versa.

It is understood that combinations of one or more of current queue lengths, maximum queue lengths, available capacity and busyness for a PSAP 104 may indicate a respective utilization of resources, and the like, at the PSAP 104. Hence, the status data 120 may alternatively be generally indicative of such respective utilization.

However, the status data 120 may indicate the state of a PSAP 104 in any suitable manner. For example, a state of a PSAP 104 may be provided in a binary manner with "0" indicating no capacity to handle more calls and/or that the PSAP 104 is inactive and/or unmanned, and "1" indicating capacity to handle more calls and/or that the PSAP 104 is active and/or manned. For example, when a PSAP 104 is offline and/or inactive and/or unmanned, the status data 120 may comprise "0" indicating the PSAP 104 is offline and/or inactive and/or unmanned. However, when a PSAP 104 is online, and has capacity to handle calls and/or the capacity is below a threshold capacity (e.g., such as 90%, 95%, amongst other possibilities) and/or the PSAP 104 is active and/or manned, the status data 120 may comprise "1"; conversely, when a PSAP 104 is online, and capacity above the threshold capacity, the status data 120 may comprise "0". Hence, the status data 120 may comprise a respective active or inactive state of a PSAP 104.

Furthermore, the status data 120 may be provided from a PSAP 104 to the call routing device 102 as a SIP message and/or in any other suitable format.

At a block 304, the controller 218, and/or the call routing device 102 receives (e.g., via the communication interface 202) the call 108 to be routed to a first PSAP 104-1 of the plurality of PSAPs 104.

For example, the call 108 may comprise a 911 call, and the like, which is received at the call routing device 102, as the call routing device 102 may be configured to receive 911 calls from an area where the communication device 106 is initiating the call 108. The controller 218, and/or the call routing device 102 may be further configured to answer the call 108 using text-to-speech functionality, for example to automatically (e.g., using an automated assistant) "speak" with a caller on the call 108 in order to determine a type of incident associated with the call 108, amongst other possibilities. However, in other examples, controller 218, and/or the call routing device 102 may not accept the call 108.

Regardless of whether or not the controller 218, and/or the call routing device 102 answers the call 108, the controller 218, and/or the call routing device 102 generally routes the call 108 to the first PSAP 104-1, which is understood, in these examples, to be associated with an area that includes a location associated with the call 108, which may be received as metadata with the call 108.

In particular, it is understood that the controller 218, and/or the call routing device 102 may determine that the call 108 is to be routed to the first PSAP 104-1 based on one or more of a location, jurisdiction and time associated with the call 108. For example, a location and time of the call 108 (and/or any suitable additional data) may be received as metadata with the call 108 (e.g., and determined by a Global Positioning System (GPS) device of the communication device 106, and/or by network components on which the call 108 is being communicated, for example using triangulation techniques). Alternatively, a jurisdiction associated with the call 108 may be determined by comparing the location associated with the call 108 to jurisdiction of the PSAPs 104 (e.g., stored at the memory 220) to determine a jurisdiction that includes the location associated with the call 108.

At a block 306, the controller 218, and/or the call routing device 102 generates a list of other PSAPS 104, of the plurality of PSAPs 104, prioritized according to the status data 120. In some examples, the list may exclude the first PSAP 104-1. The list may comprise the PSAP codes 224 of the PSAPs 104 associated with their respective priorities.

In one example, priority of the PSAPs 104 may be indicated by an order of the PSAPs 104 (and/or their respective PSAP codes 224) on the list, with the first PSAP 104 on the list having a highest priority, a second PSAP 104 on the list having next highest priority, etc., and with a last PSAP 104 on the list having a lowest priority. Alternatively, and/or in addition, a PSAP 104 with a highest priority may be assigned a priority of "1", a PSAP 104 with a next highest priority may be assigned a priority of "2", etc. However, the list may indicate the priority of the PSAPs 104 in any suitable manner.

In some examples, the controller 218, and/or the call routing device 102 may prioritize the other PSAPS 104 of the list according to respective available capacity, and/or according to busyness, of the other PSAPs 104 as indicated by the status data 120. Examples of such status data have been previously described herein, however it is understood that PSAPs 104 having a higher respective available capacity, and/or lower respective business, are generally assigned a higher priority than PSAPs 104 having a lower respective available capacity, and/or higher respective business.

It is further understood that priority may be based on further factors such as a respective location or respective jurisdiction associated with the first PSAP 14-1, the history 226, and the like.

In particular, the method 300 may further comprise the controller 218, and/or the call routing device 102 generating the list of other PSAPs 104 based on one or more of:

a respective location or respective jurisdiction associated with one or more of the first PSAP 104-1 and the other PSAPs 104. For example, a location associated with the first PSAP 104-1 may be compared to an area and/or jurisdiction of the other PSAPs 104 (e.g., stored at the memory 220) to determine other PSAPs 104 that are closest to the first PSAP 104-1 and/or associated with jurisdictions that are closest to, and/or next to and/or overlap with a respective location or respective associated with the first PSAP 104-1. Put another way, when priorities of the other PSAPs 104 are the same and/or similar (e.g., within a given priority threshold of each other, such as +/−1 level of priority using a "numbered" 1, 2, 3, . . . priority scheme, a first other PSAP 104 that is closest to the first PSAP 104-1 (and/or is associated with an adjacent jurisdiction or overlapping jurisdiction), but which has a lower priority than a second other PSAP 104 that is within the given priority threshold, the first other PSAP 104 that is closest to the first PSAP 104-1 may be reassigned a higher priority than the second other PSAP 104.

The history 226 of previous call routings or call transfers. In an example the history 226 may indicate that, previously, most calls (e.g., above a threshold call amount, such as 90% of calls, 95% of calls, amongst other possibilities) were unsuccessfully routed from the first PSAP 104-1 to the second PSAP 104-2 (e.g., the second PSAP 104-2 did not accept the calls even when respective status data 120 indicated there was capacity at the second PSAP 104-2); the history 226 may further indicate that most calls (e.g., above a respective threshold call amount, such as 90% of calls, 95% of calls, amongst other possibilities) were successfully routed from the first PSAP 104-1 to the third PSAP 104-3 (e.g., the second PSAP 104-2 did not accept the calls. Hence, in these examples, the history 226 may cause the controller 218, and/or the call routing device 102 to adjust a respective priority of the third PSAP 104-3 to a higher priority on the list than the second PSAP 104-2 even when the status data 120 initially causes the second PSAP 104-2 to have a higher priority than the third PSAP 104-3. Furthermore, in these examples, the controller 218, and/or the call routing device 102 may determine that the third PSAP 104-3 is to have a higher priority than the second PSAP 104-2 using one or more machine learning algorithms trained to assign priorities to PSAPS 104s using the history 226 as training data.

Furthermore, when the status data 120 is binary (e.g., with "0" indicating no capacity to handle more calls and "1" indicating capacity to handle more calls), such that some PSAPs 104 have a "1" state" while other PSAPs 104 have a "0" state, the PSAPs 104 having a "1" state" may be further prioritized based on the history 226. For example, the history 226 may indicate times of day that given PSAPs 104 did not accept or accepted calls; as a time of day that the call 108 is received (e.g. which may be provided in metadata with the call 108) may me known or determined, the controller 218, and/or the call routing device 102 may first priority the PSAPs 104 according to binary status data 120, with PSAPs 104 having a "1" state" having a higher priority than PSAPs 104 having a "0" state, and further prioritize the PSAPs 104 having the "1" state, based on which of the PSAPs 104 having the "1" state have a history of accepting calls at the time of day as the call 108. Such further prioritization may occur via, the controller 218, and/or the call routing device 102 using one or more machine learning algorithms trained to determine such prioritization using the history 226 as training data.

Indeed, in some examples, prioritization of PSAPs 104 on the list may occur via, the controller 218, and/or the call routing device 102 using one or more machine learning algorithms trained to determine such prioritization.

Hence, the status data 120 may be initially used to assign priorities to the PSAPs 104 on the list, and the history 226 and/or a respective location or respective jurisdiction associated with one or more of the first PSAP 104-1 and the other PSAPs 104 may be used to adjust the priorities.

Hereafter examples are provided, in which the second PSAP 104-2 is understood to have a highest respective available capacity at the list.

At a block 308, the controller 218, and/or the call routing device 102 routes (e.g., via the communication interface 202) the call 108 to the first PSAP 104-1, the call 108 routed with the list.

In some examples, the controller 218, and/or the call routing device 102 may route (e.g., via the communication interface 202) the call 108 to the first PSAP 104-1 via a Session Initiation Protocol (SIP) INVITE message, and the list may be included in a header of the SIP INVITE message.

At a block 310, the controller 218, and/or the call routing device 102 receives (e.g., via the communication interface 202), from the first PSAP 104-1, an indication to transfer the call 108 to the second PSAP 104-2 selected from the list, for example as the second PSAP 104-2 may have the highest priority on the list.

In particular, when the first PSAP 104-1 receives the SIP INVITE message, and/or any suitable indication that the call 108 is being routed to the first PSAP 104-1, the first PSAP 104-1 may determine that available capacity and/or busyness of the first PSAP 104-1 is such that the call 108 may not be handled and/or the call 108 may not be handled within a given time period (e.g. due to an RNA timer), and does not accept the call 108. Such a determination may occur automatically, for example based on a number of calls in a queue at the first PSAP 104-1, for example as compared to a maximum queue length and/or based on capacity at the first PSAP 104-1. In a particular example, automatic generation of the indication occur when the first PSAP 104-1 determines that a present capacity of the first PSAP 104-1 meeting and/or exceeding threshold capacity (e.g., such as 90%, 95%, amongst other possibilities), and the like.

The first PSAP 104-1 may hence automatically select the second PSAP 104-2 from the list as the second PSAP 104-2 has the highest priority on the list.

Alternatively, the display screen 114 may be controlled to provide an indication of the call 108, along with the list, and the operator 112 may operate the input device 116 to select a PSAP 104 from the list, for example the second PSAP 104-2, which has the highest priority.

In some examples, the indication to transfer the call 108 to the second PSAP 104-2 may comprise a SIP REFER message.

Alternatively, and/or in addition, in some examples, the indication to transfer the call 108 to the second PSAP 104-2 may comprise a code (e.g., a PSAP code 224) identifying the second PSAP 104-2, and the controller 218, and/or the call routing device 102 may identify the second PSAP 104-2 from the code. For example the SIP REFER message may identify the second PSAP 104-2 using a respective PSAP code 224, such as "104-2", and the like.

At a block 312, the controller 218, and/or the call routing device 102 transfers (e.g., via the communication interface 202) the call to the second PSAP 104.

In some examples, the controller 218, and/or the call routing device 102 may transfer (e.g., via the communication interface 202) the call 108 to the second PSAP 104-2 via a Session Initiation Protocol (SIP) INVITE message. In some examples, the call 108 may be transferred (e.g., via the communication interface 202) to the second PSAP 104-2 via a Session Initiation Protocol (SIP) INVITE message, and the list may be included in a header of the SIP INVITE message.

In some examples, the controller 218, and/or the call routing device 102 may: transfer (e.g., via the communication interface 202) the call 108 to the second PSAP 104-2 with the list; receive (e.g., via the communication interface 202), from the second PSAP 104-2, a respective indication to transfer the call 108 to a third PSAP 104 selected from the list; and transfer (e.g., via the communication interface 202) the call 108 to the third PSAP 104, such as the third PSAP 104-3.

Put another way, the blocks 308 to 312 may repeat with the call routed to the second PSAP 104-2 at the block 308, the indication of the block 310 received from the second PSAP 104-2, and the call 108 being transferred to a third PSAP 104 at the block 312, such as the third PSAP 104-3.

It is further understood that the block 302 may be repeated periodically and/or in any other suitable manner. For example as a status changes at a PSAP 104, a PSAP 104 provide updated status data 120 to the call routing device 102, which may update the list accordingly. At the block 310, an updated list may be transferred to the second PSAP 104-2 with the call 108.

Put another way, the list may be updated by the controller 218, and/or the call routing device 102, prior to the list being provided to the second PSAP 104-2, or any other PSAP 104, based on any status data 120 and/or updated status data 120, received at the controller 218, and/or the call routing device 102 at any time during execution of the method 300.

The method 300 may include other features. For example, at the block 308, when the method 300 is being repeated, the controller 218, and/or the call routing device 102 may route the call 108 to a PSAP 104 with the list and a number of times that the call has been transferred. For example, the controller 218, and/or the call routing device 102 may maintain a count of the number of times that the call has been transferred and provide that count as metadata (e.g. in a header of a SIP INVITE message) along with the list. The PSAPs 104 may be configured with an indication of a maximum number of times that a call may be transferred (e.g. 2 times, 3 times, amongst other possibilities) and compare the number of times that the call has been transferred with the maximum number of times. When the number of times that the call has been transferred is equal to the maximum number of times, a PSAP 104 receiving the call (e.g. as result of the block 308 being implemented) may accept the call (e.g. and not generate an indication to transfer the call). Put another way, when the number of times that the call has been transferred is equal to the maximum number of times, the particular instance of the method 300 may end at the block 308.

Alternatively, the controller 218, and/or the call routing device 102 may be configured with an indication of a maximum number of times that a call may be transferred (e.g. 2 times, 3 times, amongst other possibilities). The controller 218, and/or the call routing device 102 may maintain a count of the number of times that the call has been transferred and compare the number of times that the call has been transferred with the maximum number of times. When the number of times that the call has been transferred is equal to the maximum number of times, at the block 308, the controller 218, and/or the call routing device 102 may provide (e.g. in a header of a SIP INVITE message), to a PSAP 104 receiving the call, an indication that the call is not to be transferred and/or that the call is to be accepted by the PSAP 104. In some of these examples, when the number of times that the call has been transferred is equal to the maximum number of times, the list may be provided with indication that the call is not to be transferred and/or that the call is to be accepted, while in other examples the indication may not be provided with the list (e.g. in an alternative implementation of the block 308). Put another way, when the number of times that the call has been transferred is equal to the maximum number of times, the particular instance of the method 300 may end at the block 308.

Attention is now directed to FIG. 4, which depicts a flowchart representative of a PSAP-side implemented method 400 for transferring calls to public-safety answering points. The operations of the method 400 of FIG. 4 correspond to machine readable instructions that are executed by a PSAP 104, and specifically a controller of a PSAP 104 (e.g., similar to the controller 218). In the illustrated example, the instructions represented by the blocks of FIG. 4 are stored at a memory of a PSAP 104 example, as an application (e.g., similar to the memory 220 storing the application 222). The method 400 of FIG. 4 is one way that a PSAP 104 and/or the system 100 may be configured. Furthermore, the following discussion of the method 400 of FIG. 4 will lead to a further understanding of the system 100, and its various components.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well.

Furthermore, the method 400 will be described with respect to the method 300 and the first PSAP 104-1 implementing the method 400, though it is understood that the method 400 may be implemented at other PSAPs 104.

At a block 402, the first PSAP 104-1, and/or a controller thereof, receives, from the call routing device 102 (e.g., via a communication interface of the first PSAP 104-1, similar to the communication interface 202), call routing information associated with the call 108, and the list of the other PSAPs 104 prioritized according to the status data 120. The call routing information may comprise the aforementioned SIP INVITE message.

At a block 404, the first PSAP 104-1, and/or a controller thereof, generates an indication to transfer the call 108 to the second PSAP 104-2, the second PSAP 104-2 selected from the list based on a respective priority, or via the input device 116.

For example, selection of the second PSAP 104-2 may occur automatically, for example based on priorities of the PSAP 104 on the list. In particular, the second PSAP 104-2 may have the highest priority on the list and may be automatically selected. Alternatively, selection of the second PSAP 104-2 may occur via the input device 116; for example, the display screen 114 may be controlled to render the list of the PSAPs 104 on the list, with the priorities, and the operator 112 may interact with the input device 116 to select a PSAP 104, to which to route the call 108.

At a block 406, the first PSAP 104-1, and/or a controller thereof, provides, to the call routing device 102 (e.g., via a communication interface of the first PSAP 104-1) the indication to transfer the call to the second PSAP 104-2 to cause the call routing device 102 to transfer the call 108 to the second PSAP 104-2. The indication to transfer the call 108 to the second PSAP 104-2 may comprise a SIP REFER message.

The method 400 may include other features. For example, as previously described, and presuming that the method 300 has been implemented more than once at the call routing device 102 such that the call has been transferred at least once, a PSAP 104 receiving the call (e.g. at the block 402 of the method 400), may receive a number of times that the call has been transferred and compare the number of times that the call has been transferred with a maximum number of times that a call may be transferred. When the number of times that the call has been transferred is equal to the maximum number of times, a PSAP 104 receiving the call may accept the call (e.g. and not generate an indication to transfer the call at the block 404).

Alternatively, a PSAP 104 receiving the call (e.g. at the block 402 of the method 400) may further receive an indication that the call is not to be transferred and/or that the call is to be accepted by the PSAP 104. The PSAP 104 receiving the call may accept the call (e.g. and not generate an indication to transfer the call at the block 404). In these examples, the indication may be received with the list (e.g. in an alternative implementation of the block 402), or the indication may be received with the list.

Figure 5:
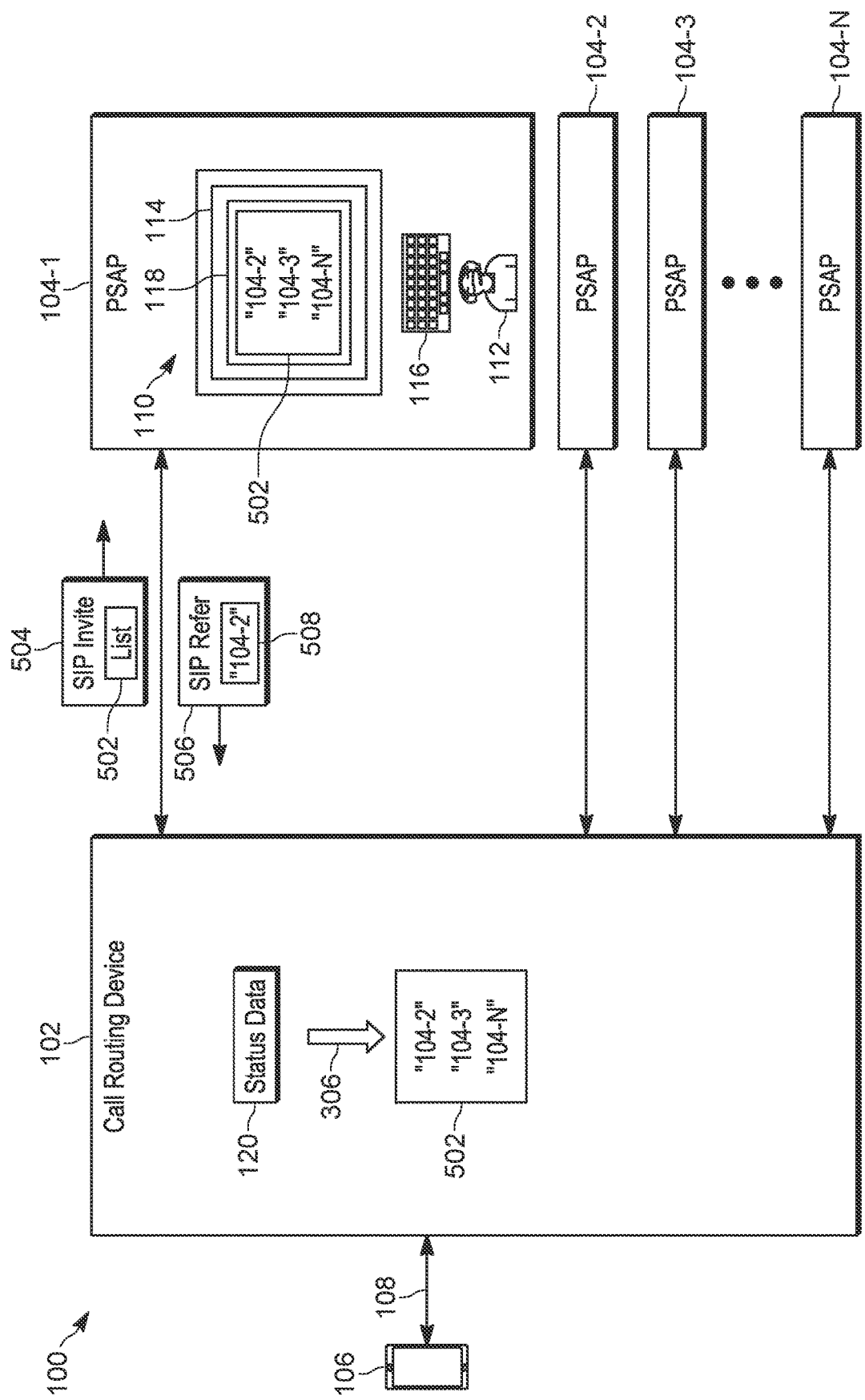
FIG. 5 depicts aspects of a method for transferring calls to public-safety answering points being implemented by the system of FIG. 1, in accordance with some examples.
Figure 6:
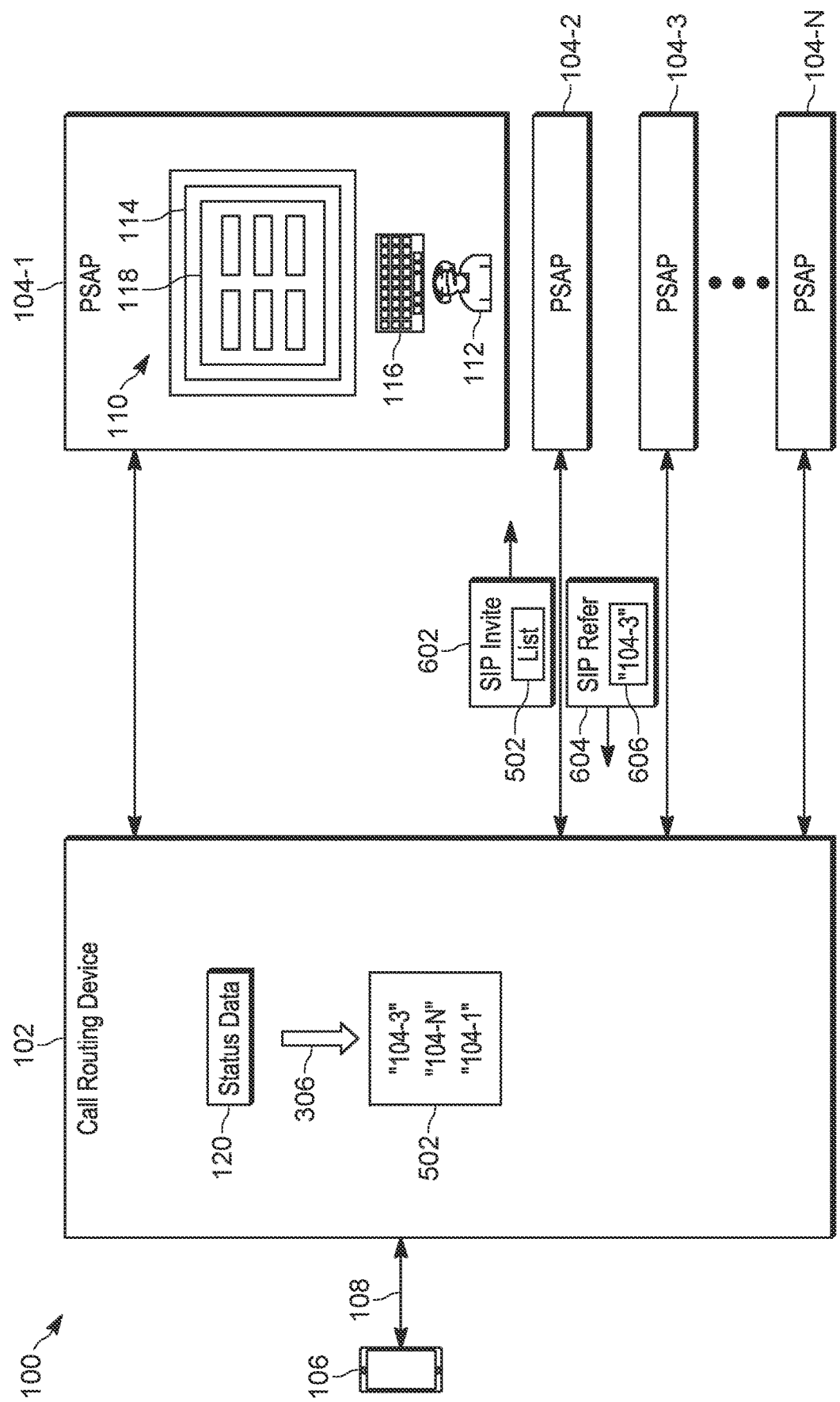
FIG. 6 depicts further aspects of PSAP-side method for transferring calls to public-safety answering points being implemented by the system of FIG. 1, in accordance with some examples.
Figure 7:
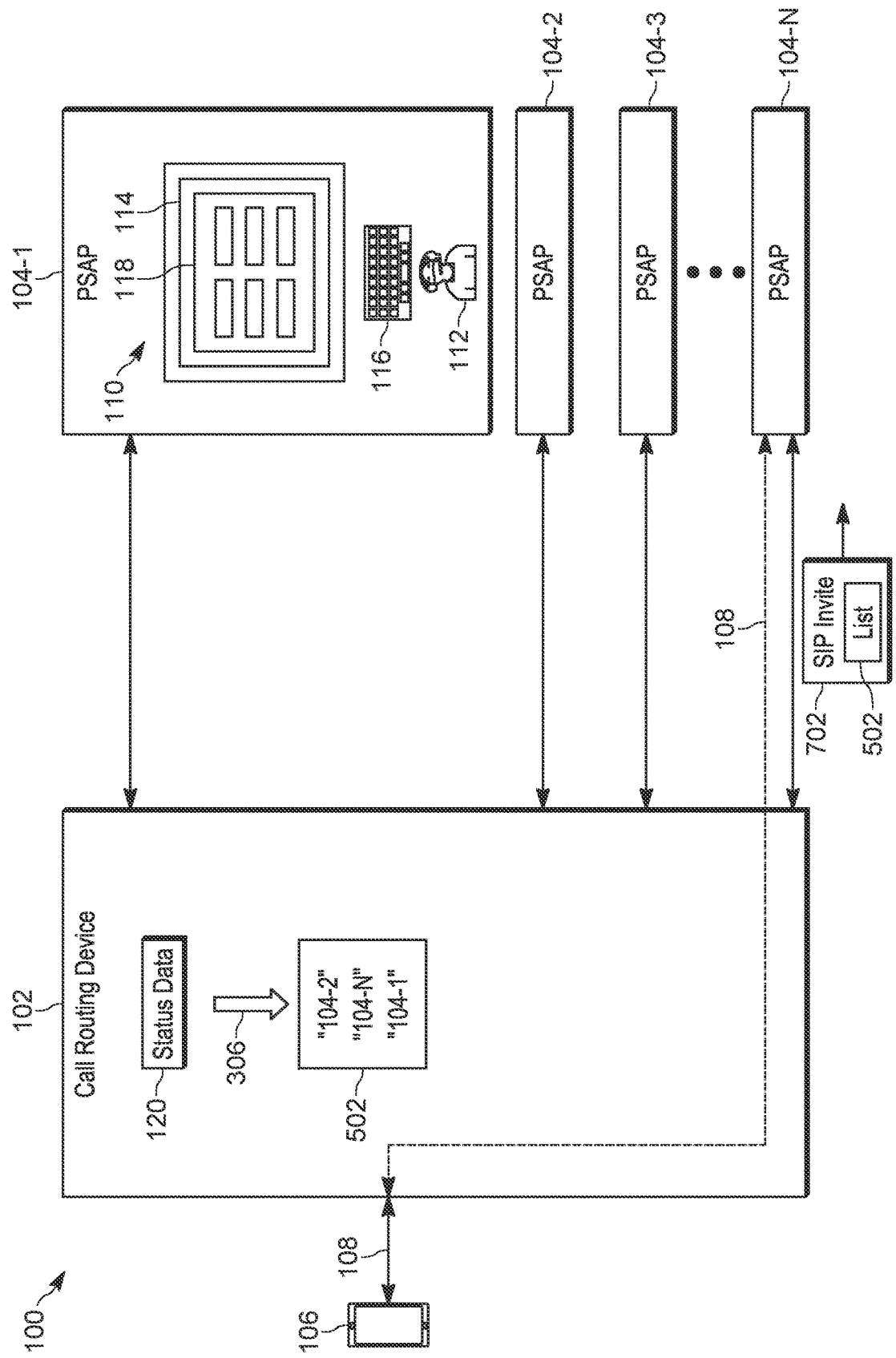
FIG. 7 depicts yet further aspects of a method for transferring calls to public-safety answering points being implemented the system of FIG. 1, in accordance with some examples.

Attention is next directed to FIG. 5, FIG. 6 and FIG. 7, which depict examples of the method 300 and the method 400. FIG. 5, FIG. 6 and FIG. 7 are substantially similar to FIG. 1, with like components having like numbers.

With attention first directed to FIG. 5, it is understood in FIG. 5 that the status data 120 has been received (e.g., at the block 302 of the method 300) at the call routing device 102, for example as depicted in FIG. 1. As also depicted in FIG. 1 and FIG. 5, the call 108 has been received (e.g., at the block 304 of the method 300) at the call routing device 102. It is understood in FIG. 5, that the call routing device 102 has determined that the call 108 is to be routed to the first PSAP 104-1, as described herein.

While, for simplicity, transmitting of the status data 120 from the PSAPs 104 to the call routing device 102 is omitted from FIG. 5, such transmitting of the status data 120 is nonetheless understood to be present.

FIG. 5 further depicts the call routing device 102 generating (e.g., at the block 306 of the method 300, as represented by an arrow in FIG. 5) a list 502 of other PSAPs 104, prioritized according to the status data 120. For example, as depicted, the list 502 comprises a list of PSAP codes 224, in an order which represents highest to lowest priority PSAPs 104. For example, the PSAP code 224 of "104-2" is first on the list 502, indicating the second PSAP 104-2 has a highest priority, the PSAP code 224 of "104-3" is second on the list 502, indicating the third PSAP 104-3 has a next highest priority, and the PSAP code 224 of "104-N" is last on the list 502, indicating the $N_{th}$ PSAP 104-N has a lowest priority.

The call routing device 102 routes (e.g., at the block 308 of the method 300) to the first PSAP 104-1, for example by transmitting a SIP INVITE message 504 to the first PSAP 104-1, which includes the list 502, for example in a header of the SIP INVITE message 504. While not depicted, it is understood that the SIP INVITE message 504 identifies the call 108 (e.g., according to SIP protocols).

As depicted, the first PSAP 104-1 receives (e.g., at the block 402 of the method 400), the SIP INVITE message 504, and generates (e.g., at the block 404 of the method 400) an indication to transfer the call 108 to the second PSAP 104-2. It is understood that the first PSAP 104-1 is selected from the list 502, by the first PSAP 104-1, based on the second PSAP 104-2 having a highest priority on the list 502, and/or or via the input device 116. For example, as depicted the display screen 114 is being controlled to render the list 502, for example at the interface 118, and the operator 112 may operate the input device 116 to select the second PSAP 104-2 from the list 502.

While not depicted, the display screen 114 may be further controlled to render an indication that the call 108 is being routed to the first PSAP 104-1, as well as electronic buttons for accepting or not accepting the call 108; the operator 112 may operate the input device 116 to not accept (or accept) the call 108 via such electronic buttons, and, when the call 108 is not accepted, the first PSAP 104-1 may provide (e.g., at the block 406 of the method 400), to the call routing device 102, the indication to transfer the call 108 to the second PSAP 104-2 to cause the call routing device 102 to transfer the call 108 to the second PSAP 104-2.

In some of these examples, the first PSAP 104-1 automatically selects the second PSAP 104-2 from the list 502 as the second PSAP 104-2 has the highest priority, while in other examples the first PSAP 104-1 may select the PSAP 104-2 from the list 502 based on a selection of the second PSAP 104-2 from the list 502 using the input device 116.

However, in other examples, the first PSAP 104-1 may generate the indication automatically, and may also select the second PSAP 104-2 from the list 502 automatically, as the second PSAP 104-2 has the highest priority. Such automatic generation of the indication may occur according to any suitable criteria, which may include, but is not limited to, a present capacity of the first PSAP 104-1 meeting and/or exceeding threshold capacity (e.g., such as 90%, 95%, amongst other possibilities), and the like.

As depicted, the indication may be provided as a SIP REFER message 506, which includes an identifier 508 of the second PSAP 104-2, for example as a PSAP code 224 of "104-2". While not depicted, the SIP REFER message 506 is further understood to identify the call 108.

The call routing device 102 receives (e.g., at the block 310 of the method 300) the SIP REFER message 506.

Attention is next directed to FIG. 6, which is understood to follow, in time, FIG. 5. As the SIP REFER message 506 identified the second PSAP 104-2 via the identifier 508, the call routing device 102 transfers (e.g., at the block 312 of the method 300) the call 108 to the second PSAP 104-2, for example via a SIP INVITE message 602, that includes the list 502.

In some examples, the list 502 may be the same as depicted in FIG. 5, however, with the second PSAP 104-2 omitted (as depicted). The first PSAP 104-1 may be included (e.g., as depicted) or omitted from the list 502. Alternatively, as depicted in FIG. 6, the list 502 may be updated, for example based on updated status data 120. As depicted, the list 502 has been modified and/or updated to indicate that the third PSAP 104-3 has highest priority (e.g., "104-3" is first on the list 502), the $N^{th}$ PSAP 104-N has a next highest priority (e.g., "104-N" is second on the list 502) and the first PSAP 104-1 has a lowest priority (e.g., "104-1" is last on the list 502).

The second PSAP 104-2 may also be implementing the method 400 and hence the second PSAP 104-2 may receive (e.g., at the block 402 of the method 400 the SIP INVITE message 602 (e.g., which is understood to identify the call 108). In some examples, the second PSAP 104-2 may accept the call 108, and the call 108 may be answered by the second PSAP 104-2, for example at a terminal 110 thereof (e.g., interchangeably referred to hereafter as the PSAP terminal 104). However to further illustrate the method 400, it is assumed in FIG. 4 that the call 108 is not accepted by the second PSAP 104-2, and the second PSAP 104-2 generates (e.g., at the block 404 of the method 400) an indication to transfer the call 108 to the third PSAP 104-3, for example as the third PSAP 104-3 has the highest priority on the list 502. The second PSAP 104-2 provides (e.g., at the block 406 of the method 400) the indication to the call routing device 102 as a SIP REFER message 604 (e.g., which is understood to identify the call 108), and which includes an identifier 606 of the third PSAP 104-3.

Attention is next directed to FIG. 7, which is understood to follow, in time, FIG. 6. As the SIP REFER message 604 identified the third PSAP 104-3 via the identifier 606, the call routing device 102 transfers the call 108 to the third PSAP 104-3, for example via a SIP INVITE message 702, that includes the list 502. The list 502 has been updated and/or modified according to updated status data 120, such that, for example, the second PSAP 104-2 again has highest priority (e.g., capacity of the second PSAP 104-2 may have increased), while the $N^{th}$ PSAP 104-2 has second highest priority and the first PSAP 104-1 has lowest priority.

The call routing device 102 provides the SIP INVITE message 702 to the third PSAP 104-3, which, in contrast to the first PSAP 104-1, and the second PSAP 104-2, accepts the call 108, which is connected to the third PSAP 104-3, as indicated by a dashed line that represents a portion of a communication link between the communication device 106 and the third PSAP 104-3, over which the call 108 is connected. While as depicted the connection is via the call routing device 102, in other examples, the connection may occur external to the call routing device 102, for example via SIP messages provided to network components that provide communication links between the communication device 106 and the third PSAP 104-3.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A call routing device comprising:
a communication interface;
a controller configured to:
  receive, via the communication interface, from a plurality of public-safety answering points (PSAPs), status data indicating respective states of the plurality of PSAPs;
  receive, via the communication interface, a call to be routed to a first PSAP of the plurality of PSAPs;
  generate a list of other PSAPs, of the plurality of PSAPs, prioritized according to the status data;
  route, via the communication interface, the call to the first PSAP, the call routed with the list;
  receive, via the communication interface, from the first P SAP, an indication to transfer the call to a second PSAP selected from the list; and
  transfer, via the communication interface, the call to the second PSAP.

2. The call routing device of claim 1, wherein the controller is further configured to select the first PSAP based on one or more of a location and jurisdiction associated with the call.

3. The call routing device of claim 1, wherein the status data comprises one or more of:
  respective current queue lengths of the plurality of PSAPs;
  respective maximum queue lengths of the plurality of PSAPs;
  respective available capacity of the plurality of PSAPs;
  respective busyness of the plurality of PSAPs;
  respective utilization of the plurality of PSAPs; and
  a respective active or inactive state of the plurality of PSAPs.

4. The call routing device of claim 1, wherein the controller is further configured to generate the list of other PSAPs based on one or more of:
  a respective location or respective jurisdiction associated with one or more of the first PSAP and the other PSAPs; and
  a history of previous call routings or call transfers.

5. The call routing device of claim 1, wherein the controller is further configured to prioritize the other PSAPs of the list according to respective available capacity of the other PSAPs as indicated by the status data, the second PSAP having a highest respective available capacity of the other PSAPs.

6. The call routing device of claim 1, wherein the controller is further configured to route the call to the first PSAP via a Session Initiation Protocol (SIP) INVITE message, wherein the list is included in a header of the SIP INVITE message.

7. The call routing device of claim 1, wherein the indication to transfer the call to the second PSAP comprises a SIP REFER message.

8. The call routing device of claim 1, wherein the indication to transfer the call to the second PSAP comprises a code identifying the second PSAP, and the controller is further configured to identify the second PSAP from the code.

9. The call routing device of claim 1, wherein the controller is further configured to:
  transfer the call to the second PSAP with the list;
  receive, from the second PSAP, a respective indication to transfer the call to a third PSAP selected from the list; and
  transfer the call to the third PSAP.

10. A system comprising:
a call routing device; and
a plurality of public-safety answering points (PSAPs), including a first PSAP,
the call routing device configured to:
  receive, from the plurality of PSAPs, status data indicating respective states of the plurality of PSAPs;
  receive a call to be routed to the first PSAP of the plurality of PSAPs;
  generate a list of other PSAPs, of the plurality of PSAPs, prioritized according to the status data;
  route the call to the first PSAP, the call routed with the list;
  receive from the first PSAP, an indication to transfer the call to a second PSAP selected from the list; and
  transfer the call to the second PSAP,
the first PSAP device configured to:
  receive, from the call routing device, call routing information associated with the call and the list of the other PSAPs prioritized according to the status data;
  generate the indication to transfer the call to the second PSAP, the second PSAP selected from the list based on a respective priority, or via an input device; and
  provide, to the call routing device, the indication to transfer the call to the second PSAP to cause the call routing device to transfer the call to the second PSAP.

11. A method comprising:
receiving, via a call routing device, from a plurality of public-safety answering points (PSAPs), status data indicating respective states of the plurality of PSAPs;
receiving, via the call routing device, a call to be routed to a first PSAP of the plurality of PSAPs;
generating, via the call routing device, a list of other PSAPs, of the plurality of PSAPs, prioritized according to the status data;
routing, via the call routing device, the call to the first PSAP, the call routed with the list;
receiving, via the call routing device, from the first PSAP, an indication to transfer the call to a second PSAP selected from the list; and
transferring, via the call routing device, the call to the second PSAP.

12. The method of claim 11, further comprising selecting the first PSAP based on one or more of a location and jurisdiction associated with the call.

13. The method of claim 11, wherein the status data comprises one or more of:
  respective current queue lengths of the plurality of PSAPs;
  respective maximum queue lengths of the plurality of PSAPs;
  respective available capacity of the plurality of PSAPs; and
  respective busyness of the plurality of PSAPs.

14. The method of claim 11, further comprising generate the listing of other PSAPs based on one or more of:
  a respective location or respective jurisdiction associated with one or more of the first PSAP and the other PSAPs; and
  a history of previous call routings or call transfers.

15. The method of claim 11, further comprising prioritizing the other PSAPS of the list according to respective available capacity of the other PSAPs as indicated by the status data, the second PSAP having a highest respective available capacity of the other PSAPs.

16. The method of claim 11, further comprising routing the call to the first PSAP via a Session Initiation Protocol (SIP) INVITE message, wherein the list is included in a header of the SIP INVITE message.

17. The method of claim 11, wherein the indication to transfer the call to the second PSAP comprises a SIP REFER message.

18. The method of claim 11, wherein the indication to transfer the call to the second PSAP comprises a code identifying the second PSAP, and the method further comprises identifying the second PSAP from the code.

19. The method of claim 11, further comprising:
transferring the call to the second PSAP with the list;
receiving, from the second PSAP, a respective indication to transfer the call to a third PSAP selected from the list; and
transferring the call to the third PSAP.

20. The method of claim 11, further comprising:
receiving, at the first PSAP, from the call routing device, call routing information associated with the call and the list of the other PSAPs prioritized according to the status data;
generating, at the first PSAP, the indication to transfer the call to the second PSAP, the second PSAP selected from the list based on a respective priority, or via an input device; and
providing, from the first PSAP, to the call routing device, the indication to transfer the call to the second PSAP to cause the call routing device to transfer the call to the second PSAP.

* * * * *